United States Patent
Hsieh (10) Patent No.: US 9,809,387 B2
(45) Date of Patent: Nov. 7, 2017

(54) ANTI-STICKING CONVEYOR BELT AND CONVEYOR STRIPS OF FRYING MACHINE

(71) Applicants: CHUAN YANG FOODS MACHINE CO., LTD., Kaohsiung (TW); Mu-Lin Hsieh, Kaohsiung (TW)

(72) Inventor: Mu-Lin Hsieh, Kaohsiung (TW)

(73) Assignees: Chuan Yang Foods Machine Co., Ltd., Kaohsiung (TW); Mu-Lin Hsieh, Kaohsiung (TW)

( * ) Notice: Subject to any disclaimer, the term of this patent is extended or adjusted under 35 U.S.C. 154(b) by 0 days.

(21) Appl. No.: 15/069,363

(22) Filed: Mar. 14, 2016

(65) Prior Publication Data
US 2017/0260002 A1    Sep. 14, 2017

(51) Int. Cl.
*B65G 15/54*    (2006.01)
*B65G 17/06*    (2006.01)
*A47J 37/12*    (2006.01)

(52) U.S. Cl.
CPC ........ *B65G 17/067* (2013.01); *A47J 37/1271* (2013.01); *B65G 2207/22* (2013.01)

(58) Field of Classification Search
CPC .. B02C 18/225; B65G 17/063; B65G 17/064; B65G 15/54; B65G 2201/202; B01F 11/0077
USPC ........................................................ 198/848
See application file for complete search history.

(56) References Cited

U.S. PATENT DOCUMENTS

| 8,312,989 B2* | 11/2012 | McCormick | B65G 17/063 198/849 |
| 2009/0297671 A1* | 12/2009 | Basker | A23B 7/045 426/102 |
| 2015/0133040 A1* | 5/2015 | Remmer | A22C 21/022 452/86 |
| 2015/0327709 A1* | 11/2015 | Peers | A23P 30/10 426/389 |

* cited by examiner

*Primary Examiner* — Leslie A Nicholson, III
*Assistant Examiner* — Lester Rushin
(74) *Attorney, Agent, or Firm* — Muncy, Geissler, Olds & Lowe, P.C.

(57) ABSTRACT

An anti-sticking conveyor belt of a frying machine includes a first transmission axle and a second transmission axle oppositely disposed, two chains, a plurality of connecting rods and a plurality of conveyor strips. Each conveyor strips is made of a high temperature resistant and anti-sticking material, and includes a conveyor belt surface for conveying fried products, a conveyor lower surface away from each conveyor belt surface, and a channel provided outwards between each conveyor belt surface and each conveyor lower surface. As each conveyor belt surface is greater than each conveyor lower surface and with cooperation of the chains, leveled progressing of the conveyor strips is maintained. At arched positions of the first transmission axle and the second transmission axle, the conveyor lower surfaces do not come into contact with one another, and the conveyor belt surfaces arranged are small to obtain an even and flat conveying plane.

8 Claims, 12 Drawing Sheets

ANTI-STICKING CONVEYOR BELT AND CONVEYOR STRIPS OF FRYING MACHINE

FIELD OF THE INVENTION

The present invention relates to an anti-sticking conveyor belt and associated conveyor strips of a frying machine, and particularly to an anti-sticking conveyor belt and associated conveyor strips suitable for continuously conveying fried products.

BACKGROUND OF THE INVENTION

A conveyor belt of a conveyor machine is used for conveying various kinds of fried products. In general, a conveyor belt is formed by multiple conveyor strips that are usually made of a high temperature resistant and non-sticking material, such as Teflon™. Thus, most conveyor strips have surfaces clad with a Teflon™ layer, contain strip-like Teflon™ strips or are entirely made of Teflon™. In the description below, three main types of conveyor strips of a conventional conveyor machine are described with reference to FIG. 1 to FIG. 3.

Figure 1:
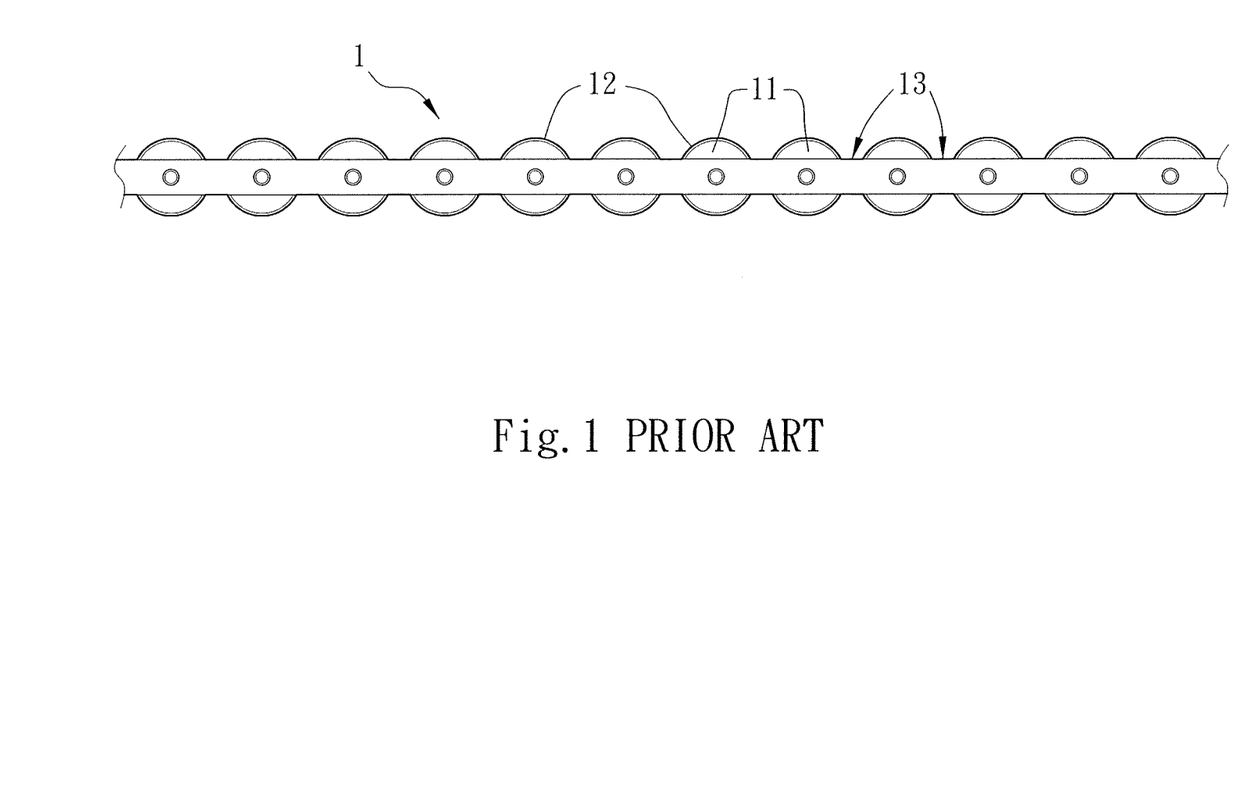
FIG. 1 is a partial side view of a first conventional conveyor belt.

In a first conventional type of conveyor belt 1, The conveyor belt 1 is formed by pivotally connecting a plurality of round rods 11 having surfaces clad with a thin Teflon™ layer 12. The surface of each of the round rods 11 has an arched plane for conveying fried products. However, the thin Teflon™ layer 12 at the surface of the each of the round rods 11 of the conveyor belt 1 frequently comes into contact with the high temperature of the frying oil, and may likely disengage from the surface of each of the round rods 11 after a period of use, hence revealing the round rods 11.

However, first of all, when the conveyor belt 1 conveys fried products, the surface of each of the round rods 11 from which the Teflon™ layer 12 has disengaged is liable to sticking to the fried products. Fried meat products are particularly liable to sticking, and so the conveyor belt 1 may damage an appearance of the fried products.

Secondly, due to a large gap among the round rods 11 (as shown in FIG. 1), when the conveyor belt 1 conveys fried products using the round rods 11, large-sized fried products may be caused to have bumpy and uneven surfaces.

Figure 2:
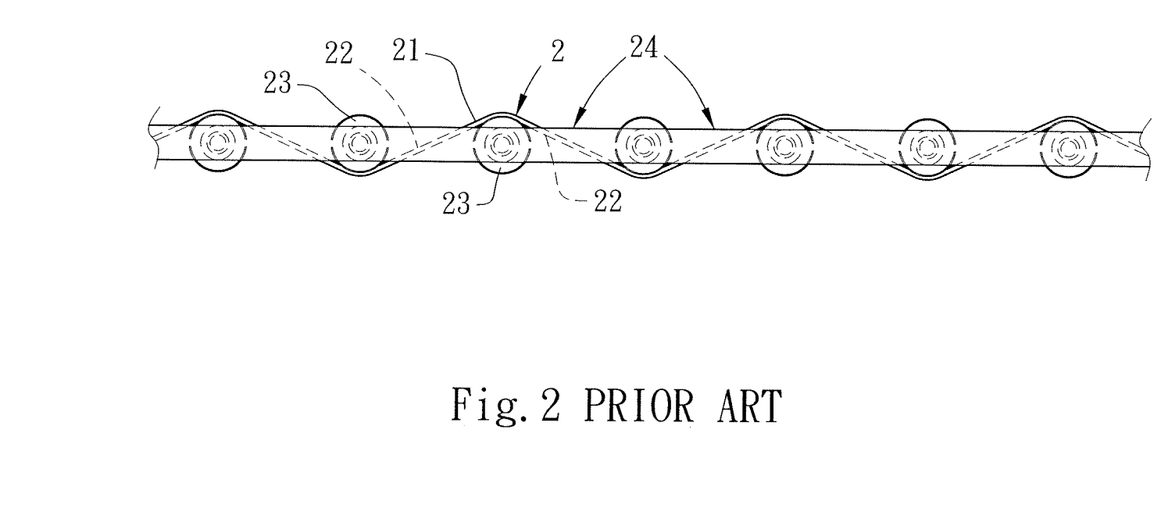
FIG. 2 is a partial side view of a second conventional conveyor belt.

In the second conventional type of conveyor belt 2, the conveyor belt 2 includes a plurality of vertically alternately arranged arched grooves 22 to form a curved Teflon™ belt 21. A connecting rod 23 that is not provided with Teflon™ is inserted into each of the plurality of arched grooves of the Teflon™ belt 21.

However, when the conveyor belt 2 conveys fried products, surfaces of the connecting rods 11 not provided with Teflon™ are likely to stick to the fried products, such that not only surfaces and appearances of the fried products are damaged, but also the conveyor belt 2 needs to be frequently cleaned to result in application inconveniences.

Secondly, due to large gaps 24 among the round rods 23 (as shown in FIG. 1), when the conveyor belt 2 conveys fried products using the connecting rods 23, large-sized fried products may be caused to have bumpy and uneven surfaces.

Thirdly, as the Teflon™ belt 21 is inserted among the connecting rods 23 and is in a tensed state, qualitative change and breakage of the Teflon™ belt 21 may easily occur. Thus, such conveyor belt 2 is non-ideal.

Figure 3:
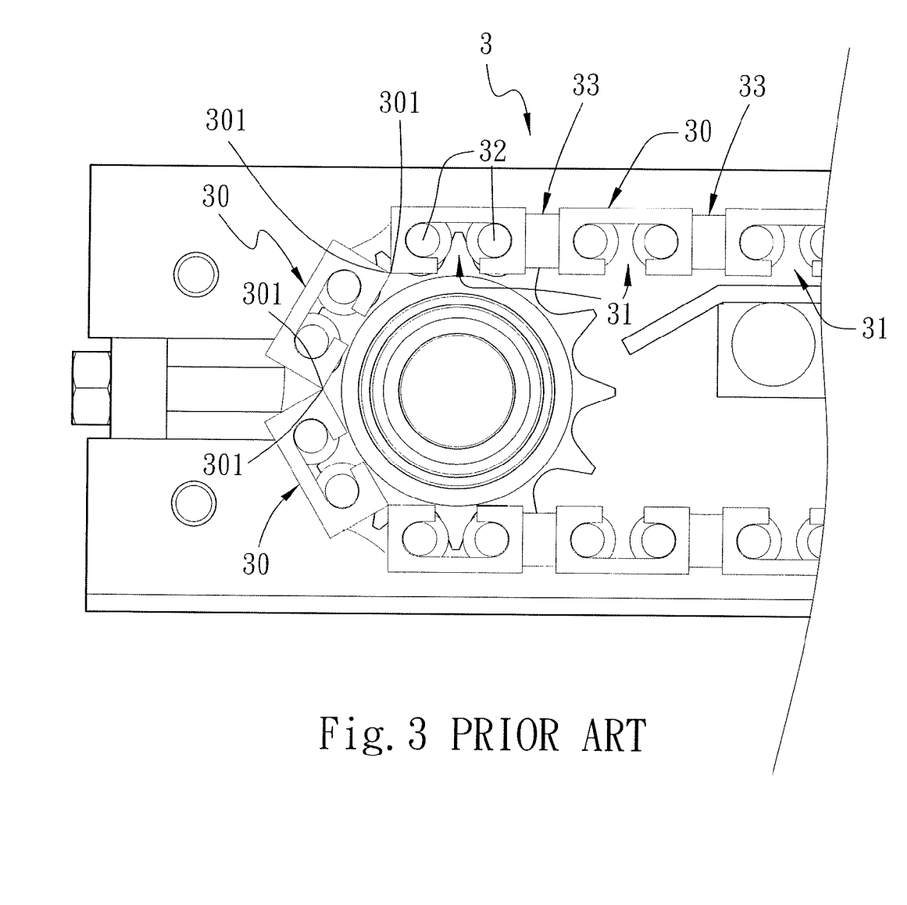
FIG. 3 is a partial side view of a third conventional conveyor belt.

In the third type of conveyor belt 3, the conveyor belt 3 is formed by rectangular Teflon™ strips 30. An opening 31 is provided at the bottom of each of the Teflon™ strips 30, and a connecting rod 32 is internally inserted at each of two sides for pivotal connection. As the Teflon™ strips 30 used by the conveyor belt 3 have flat and even surfaces, better conveying planes are provided compared to the first and second types of conveyor belts. However, the conventional conveyor belt 3 easily suffers from issues below during a process of conveying fried products.

First of all, to allow chains coordinating with the Teflon™ strips 30 of the conveyor belt 3 to smoothly turn at turning positions, and to prevent the Teflon™ strips 30 of the conveyor belt 3 from coming into contact with one another at corners 301 at two sides (as shown in FIG. 3), extremely large gaps 33 exists among the Teflon™ strips 30, hence similarly causing large-sized fried products to appear bumpy and uneven.

Secondly, when the conveyor belt 3 conveys fried products, the openings 31 provided below the respective Teflon™ strips 30 of the conveyor belt 3 are hollow and are located in the chains. As a result, the inside of the Teflon™ strips 30 may be filled with undesired residual materials that are not easy to clean, hence causing hygiene issues.

SUMMARY OF THE INVENTION

The primary object of the present invention is to provide an anti-sticking conveyor belt and associated conveyor strips of a frying machine to allow fried products to progress levelly during a conveying process. Thus, the present invention solves issues of the three foregoing conventional conveyor belt, including bumpy and uneven surfaces of large-sized fried products, cleaning difficulties of conveyor strips and undesired residual materials caused by large gaps that are kept for preventing contact of the Teflon™ strips at corners.

To achieve the above object, the present invention provides an anti-sticking conveyor belt of a frying machine. The conveyor belt includes a first transmission axle and a second transmission axle that are disposed in opposite, two chains, a plurality of connecting rods and a plurality of conveyor strips. The first transmission axle has one end externally engaged with a power unit. Each of the chains is accommodated around the first transmission axle and the second transmission axle to form engagement. Power is provided by the power unit to drive each of the chains to progress along a turning track and to drive the second transmission axle to rotate. The two ends of each of the connecting rods is pivotally connected and linked with each of the chains. Each of the conveyor strips is made of a high temperature resistant material, and includes a conveyor belt surface for conveying fried products, a conveyor lower surface away from each of the conveyor belt surfaces, and a channel provided outwards at each of two sides between each of the conveyor belt surfaces and each of the conveyor lower surfaces. Each of the channels is inserted by one of the connecting rods, such that the two ends of each of the connecting rods are caused to be pivotally connected and linked with each of the chains, which further drive each of the conveyor strips to rotate. Each of the conveyor belt surfaces is larger than each of the conveyor lower surfaces, and with cooperation of each of the chains, leveled progressing is maintained. Further, when each of the chains reaches arched positions of first transmission axle and the second transmission axle, the conveyor lower surfaces do not come into contact with one another, and arrangement gaps among the conveyor belt surfaces are kept small to obtain an even and flat conveying plane.

The present invention further provides an anti-sticking conveyor strip of a frying machine applied as a conveyor strip for conveying fried products. The anti-sticking conveyor strip is made of a high temperature resistant and anti-sticking material, and includes a conveyor belt surface for conveying fried products, a conveyor lower surface away from each of the conveyor belt surfaces, and a channel provided outwards at each of two sides between each of the conveyor belt surfaces and each of the conveyor lower surfaces.

It is known from the above description that, the anti-sticking conveyor belt and conveyor strips of a frying machine of the present invention provides following effects and industrial values.

1. In the present invention, the width of each of the conveyor strips is larger than the width of each of the conveyor lower surfaces. When the conveyor belt turns at a turning position, the conveyor lower surfaces do not come into contact with one another, and arrangement gaps among the conveyor belt surfaces are also kept small. Thus, a flat and even conveying plane is obtained, such that surfaces of fried products conveyed by the conveyor belt are not caused to be bumpy and uneven to provide better appearances.

DETAILED DESCRIPTION OF THE PREFERRED EMBODIMENTS

To better understand the object, technical contents, characteristics and effects of the present invention, structural, assembly and application details of the present invention are given with the accompanying drawings below.

Referring to FIG. 4 and FIG. 5A to FIG. 10, the present invention provides an anti-sticking conveyor belt and associated conveyor strips of a frying machine.

Figure 4:
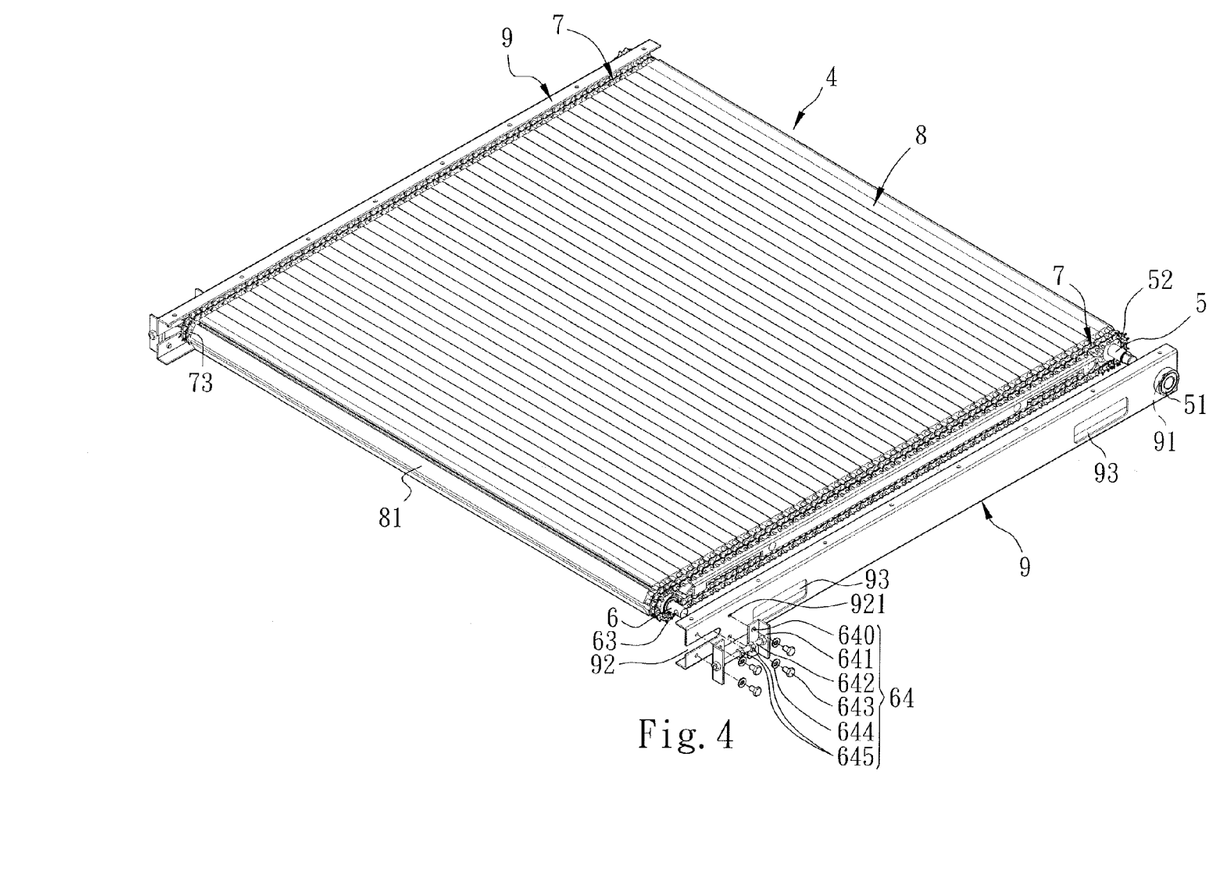
FIG. 4 is a perspective exploded view of a conveyor belt of the present invention.

A conveyor belt 4 includes a first transmission axle 5 and a second transmission axle 6 oppositely disposed, two chains 7, a plurality of connecting rods 73, and a plurality of conveyor strips 8.

Each of two opposite outer ends of the first transmission axle 5 is pivotally connected to a first bearing 51 and a first gear 52 for the first transmission axle 5 to rotate smoothly. One end of the first transmission axle 5 is further engaged with an external power unit (not shown) as a power motor, which provides power for driving the two chains 7 to progress along a turning track and to drive the second transmission axle 6 to rotate.

Each of two opposite outer ends of the second transmission axle 6 is pivotally connected to a second bearing 61 and the second gear 62 for the second transmission axle 6 to rotate smoothly. Each of two opposite outer ends of the second transmission axle 6 away from the second bearing 61 includes a through hole 63.

Figure 6:
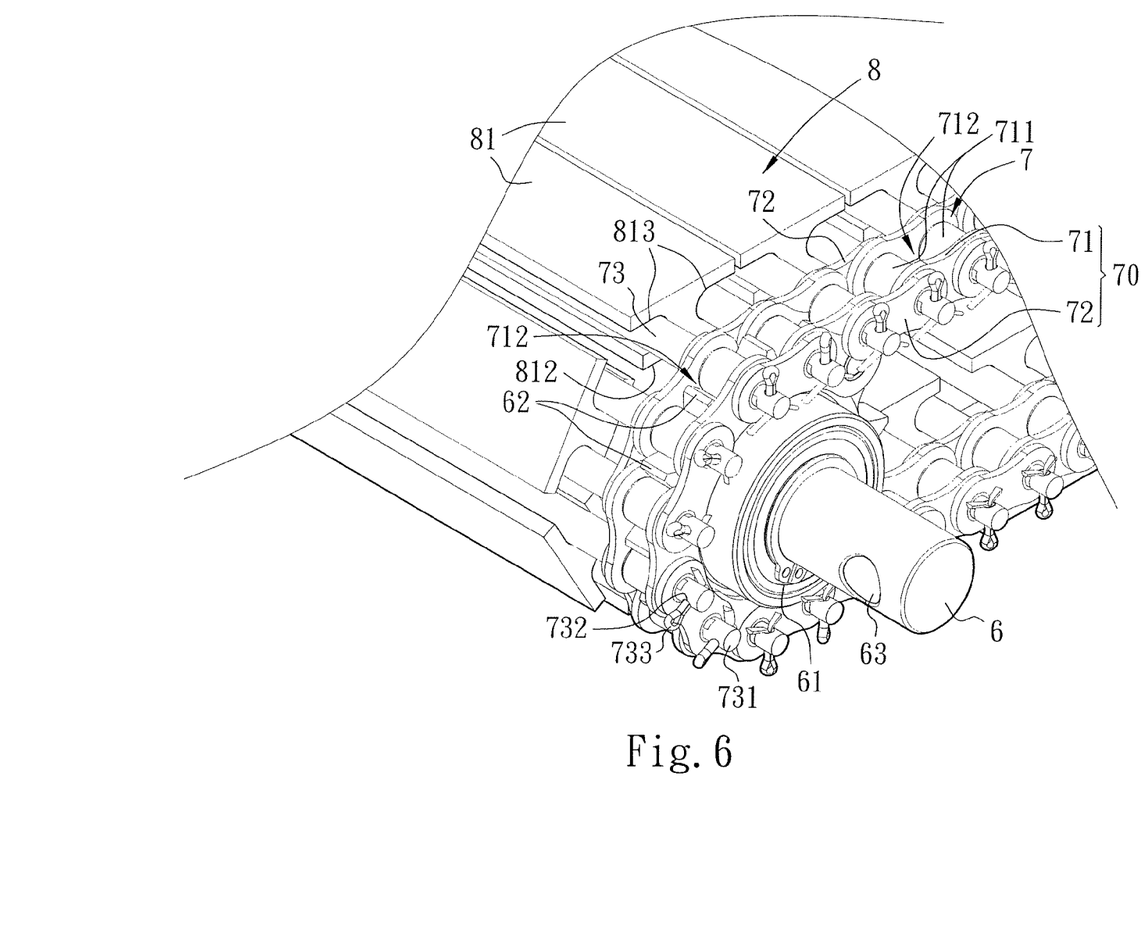
FIG. 6 is an enlarged partial view of conveyor strips and chains of the conveyor belt in FIG. 4.
Figure 7:
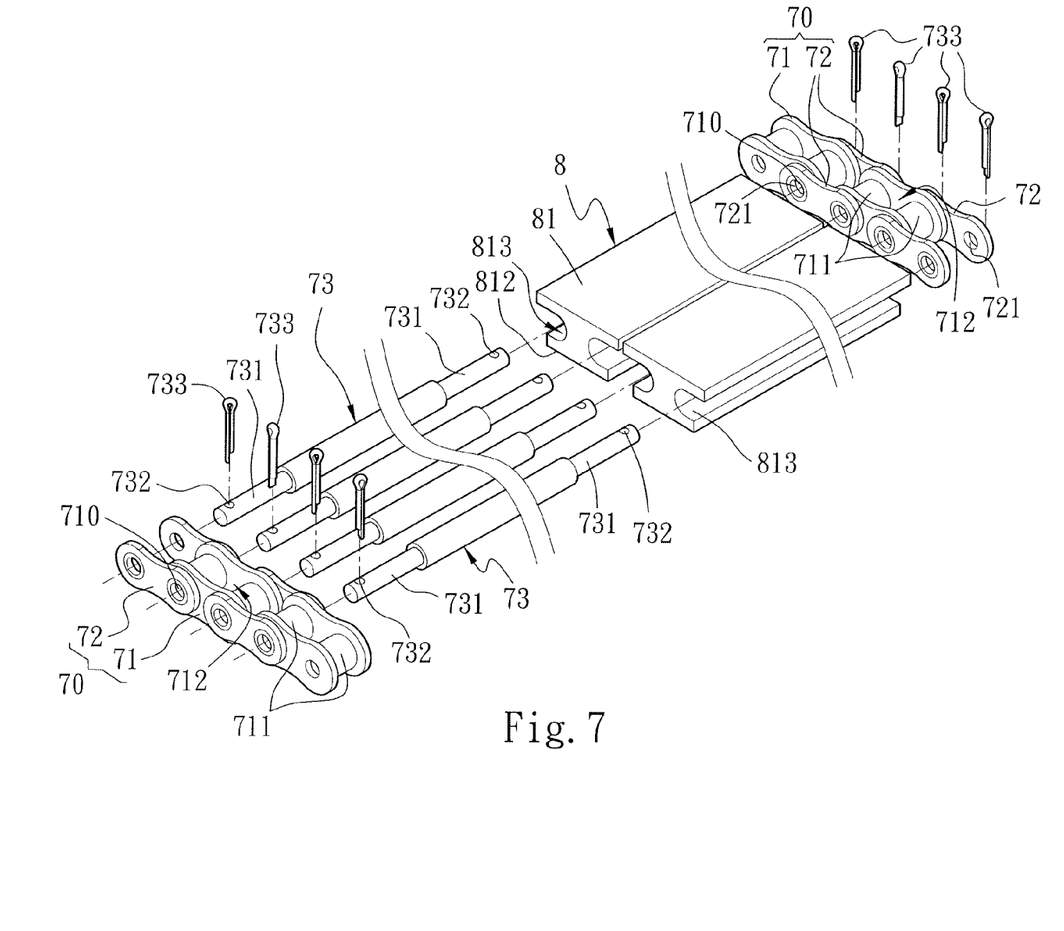
FIG. 7 is a perspective exploded view of conveyor strips and chains of the conveyor belt in FIG. 4.
Figure 8:
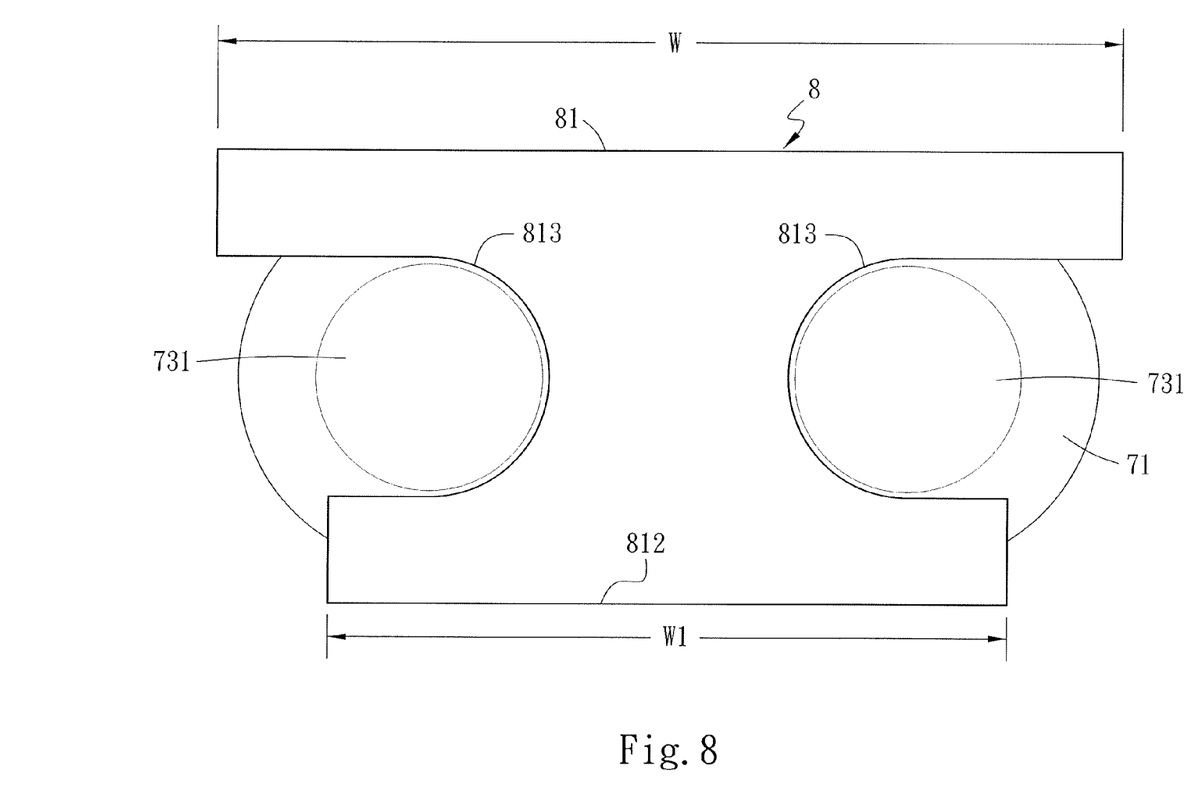
FIG. 8 is a side view of an assembly of the conveyor belt and the chains in FIG. 7.

Each of the two chains 7 is accommodated around and engaged with the first gear 52 of the first transmission axle 5 and the second gear 62 of the second transmission axle 6 to form transmission. More specifically, each of the chains 7 includes a plurality of connecting portions 70, and each of the connecting portions 70 includes an inner connecting section 71 and an outer connecting section 72 pivotally connected towards one end of the inner connecting section 71. In the embodiment, each of the inner connecting section 71 includes two wheel shafts 711 each including a first axle opening 710, and an engagement space 712 between the two wheel shafts 711 and engaged with the first gear 52 and the second gear 62 to form transmission, such that each of the inner connecting sections 71 drives each of the chains 7 to rotate. Each of the outer connecting sections 72 includes two second axle openings 721, and each of the two second axle openings 721 is pivotally connected and linked with one of the wheel shafts 711 of each of the inner connecting sections 71.

An axle shaft 731 is extended from each of the two ends of each of the connecting rods 73. An outer diameter of the two axle shafts 731 is smaller than an outer diameter of the connecting rods 73. The two axle shafts 731 are respectively penetrated and pivotally connected towards the two second axle openings 721 of each of the outer connecting sections 72, or penetrated and pivotally connected towards the two first axle openings 710 of each of the inner connecting sections 71. In the embodiment, each of the axle shafts 731 at the two ends of the each of the connecting rods 73 includes a fastening holes 732. A fastening member 733 is inserted into each of the fastening holes 732 of each of the axle shafts 731, and ends of each of the fastening members 733 are bent and fastened, such that the fastening members 733 do not disengage from the fastening holes 732.

Each of the conveyor strips 8 is made of a high temperature resistant and anti-sticking material. More specifically, the anti-sticking material is Teflon™. Each of the conveyor strips 8 includes a conveyor belt surface 81 for conveying fried products, a conveyor lower surface 812 away from the conveyor belt surfaces 81, and a channel 813 provided outwards at each of two sides between each of the conveyor belt surfaces 81 and each of the conveyor lower surfaces 812. Each of the channels 813 of each of the conveyor strips 8 is penetrated by each of the connecting rods 73, and the axle shaft 731 at each of the two ends of each of the connecting rods 73 is pivotally connected and linked with each of the chains 7. Each of the conveyor strips 8 is driven by each of the chains 7 to rotate to further convey fried products.

Figure 9:
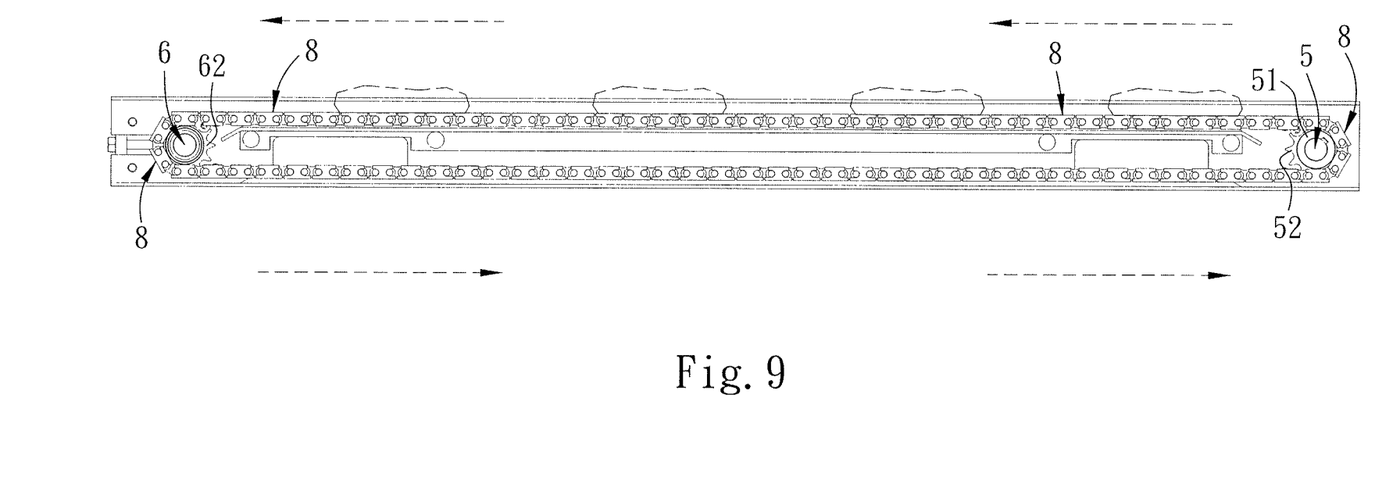
FIG. 9 is a schematic diagram of a conveyor belt of the present invention conveying fried products.
Figure 10:
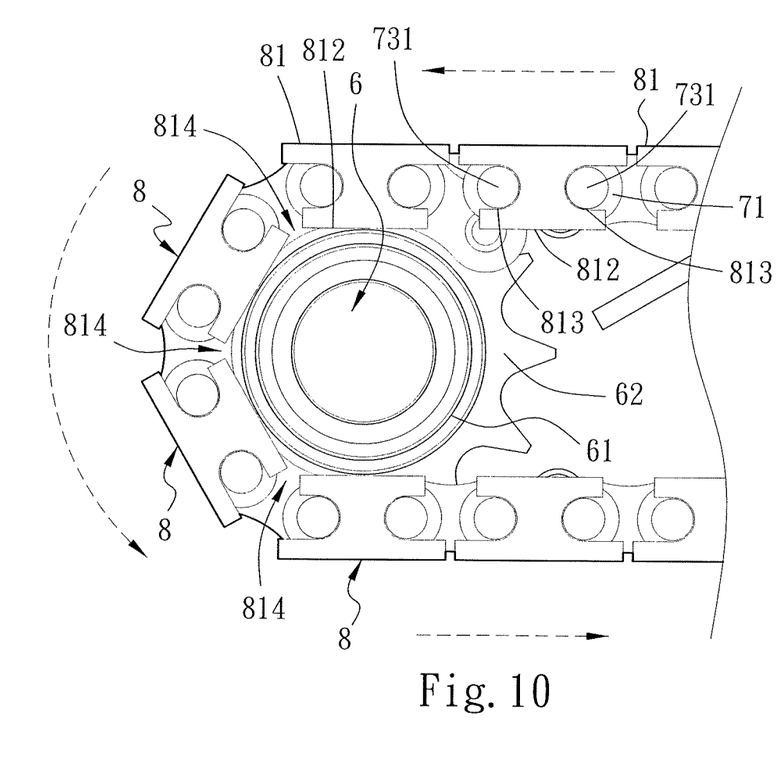
FIG. 10 is a partial enlarged schematic diagram of the conveyor strips of the conveyor belt in FIG. 9 during a conveying process.

More specifically, each of the conveyor belt surfaces 81 and each of the conveyor lower surfaces 812 of each of the conveyor strips 8 have asymmetrical long appearances, and a width of each of the conveyor belt surfaces 81 is greater than a width W1 of each of the conveyor lower surfaces 812 of each of the conveyor strips 8. Cooperating with each of the chains 7, leveled progressing is maintained. When each of the conveyor strips 8 reaches an arched position of the first transmission axle 5 and the second transmission axle 6, a gap 814 is formed among the conveyor lower surfaces 812 of each of the conveyor strips 8 without the conveyor lower surfaces 812 coming into contact with one another (as shown in FIG. 9 and FIG. 10). Thus, arrangement gaps among the conveyor belt surface 81 are kept small to achieve an even and flat conveying plane, such that surfaces of fried products on each of the conveyor strips 8 are also kept even and flat without incurring bumps on the surfaces of fried products to provide better appearances. Further, when each of the conveyor strips 8 passes a turning corner, undesired residuals after frying may be easily cleaned through the two channels 813 provided outwards.

Figure 5A:
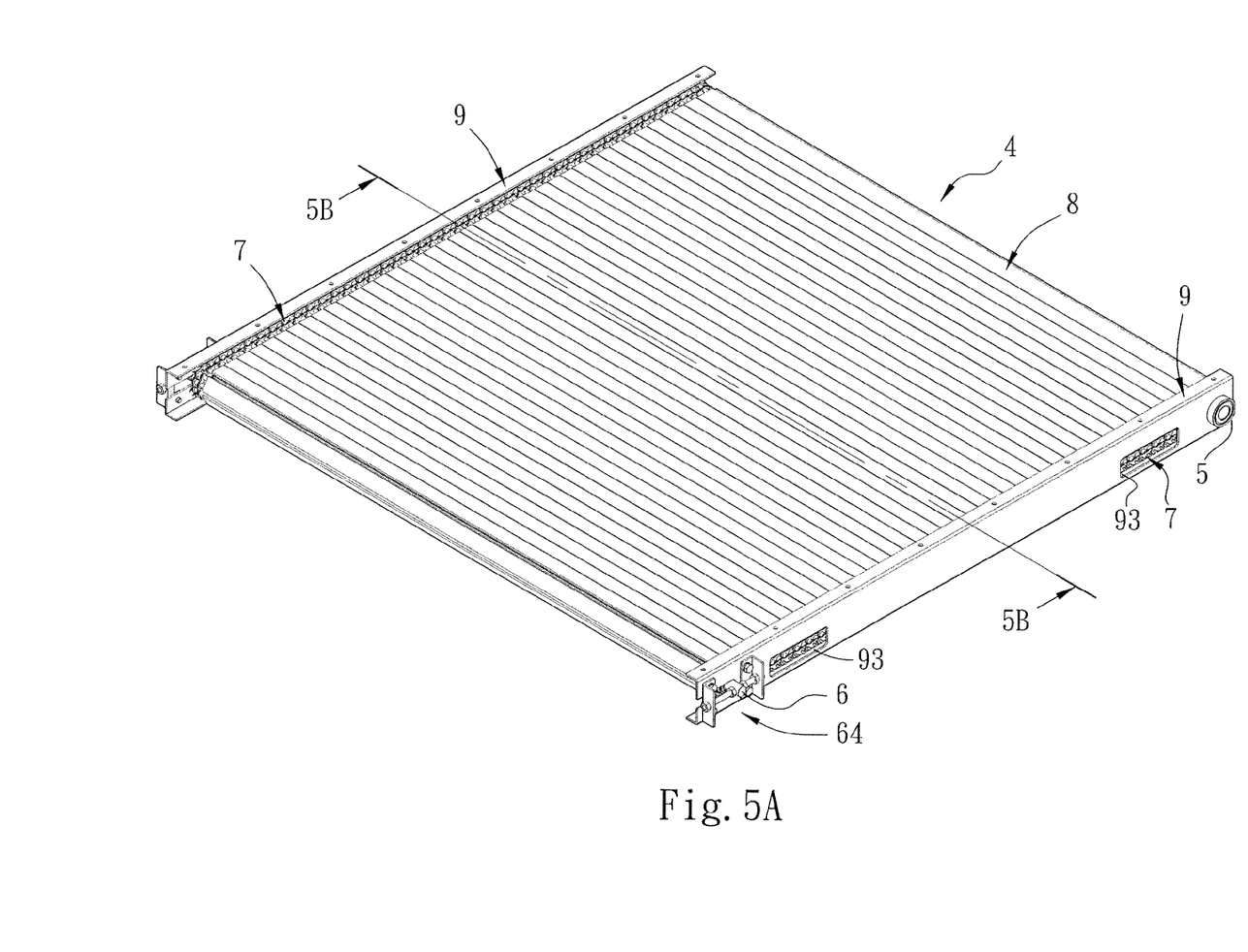
FIG. 5A is a perspective view of an assembly of a conveyor belt of the present invention.
Figure 5B:
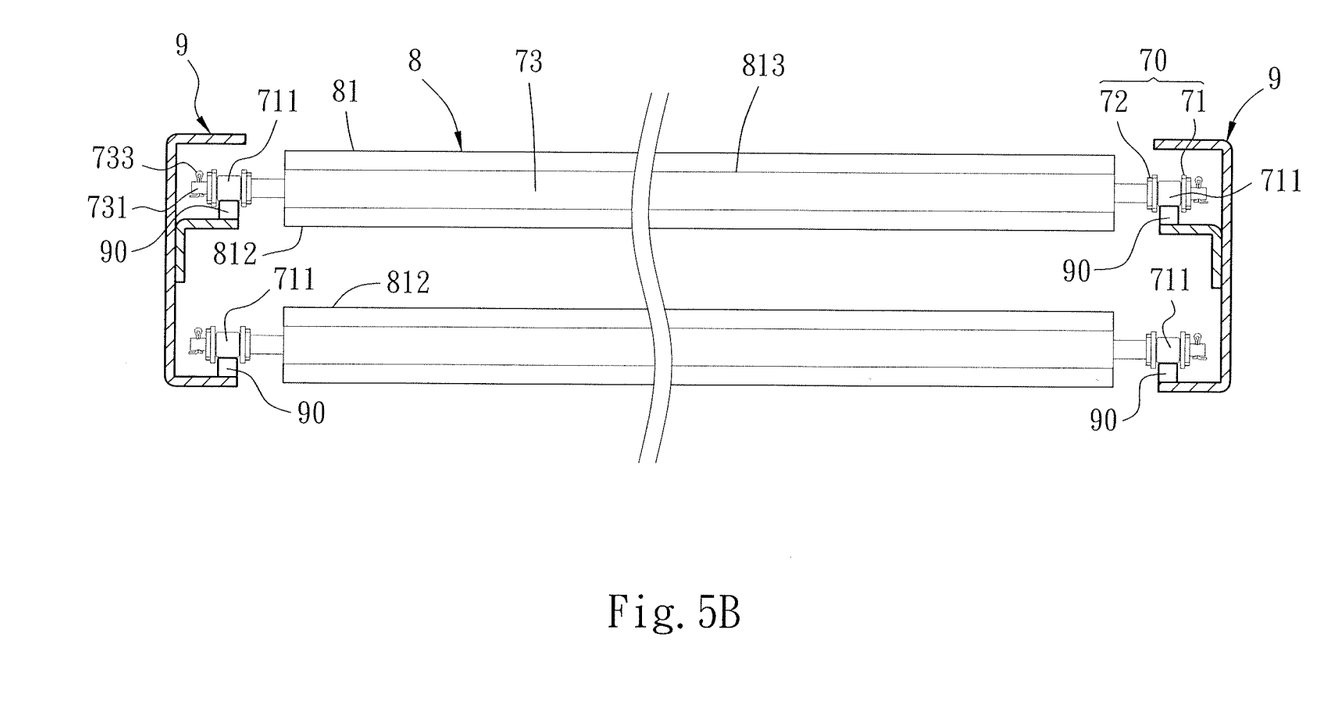
FIG. 5B is a section view of FIG. 5A along 5B-5B.

Referring to FIG. 5A and FIG. 5B, the conveyor belt 4 of the present invention further includes two tracks 9 respectively disposed towards an outer side of each of the chains 7. Each of the tracks 9 is a horseshoe shape positioned on one side. In the embodiment, each of the tracks 9 includes a first hole 91 for penetrating the two ends of the first transmission axle 5, and a slot hole 92 away from one end of the first hole 91. Each of the slot holes 92 is for penetrating the two ends of the second transmission axle 6, and includes a plurality of positioning holes 921 at edge positions thereof. Each of the tracks 9 further includes at least one inspection opening 93 for easy inspection of each of the conveyor strips 8 of the conveyor belt 4. In this embodiment, there are two inspection openings 93 that are provided at two inner positions towards each of the first holes 91 and each of the slot holes 92. In the embodiment, each of an upper section and a lower section at an inner side of each of the tracks 9 is provided with a guiding bracket 90. Each of the brackets 90 supports and holds each of the wheel shaft 711 of each of the inner connecting sections 71 of each of the chains 7, guides each of the inner connecting sections 71 of each of the chains 7 to have better stability at the turning track, and prevents the conveyor belt 4 from sinking during the progressing of fried products, thereby ensuring leveled movements of the conveyor belt 4 during the conveying process.

If any of the conveyor strips 8 of the conveyor belt 4 gets damaged after having been used for a period of time, the damaged conveyor strip 8 may be removed. More specifically, via the corresponding inspection opening 93, the fastening members 733 assembled on the damaged conveyor strip 8 may be withdrawn and removed from the corresponding fastening holes 732. Each of the chains 7 and each of the connecting rods 73 are then loosened, and the damaged conveyor strip 8 may then be replaced by a new conveyor strip 8. Each of the connecting rods 73 and each of the chains 7 are sequentially assembled, the corresponding fastening members 733 are inserted into the corresponding fastening holes 732, and the ends of the corresponding fastening members 733 are bent and fastened such they do not disengage from the corresponding fastening holes 732, hence facilitating user maintenance.

Figure 11:
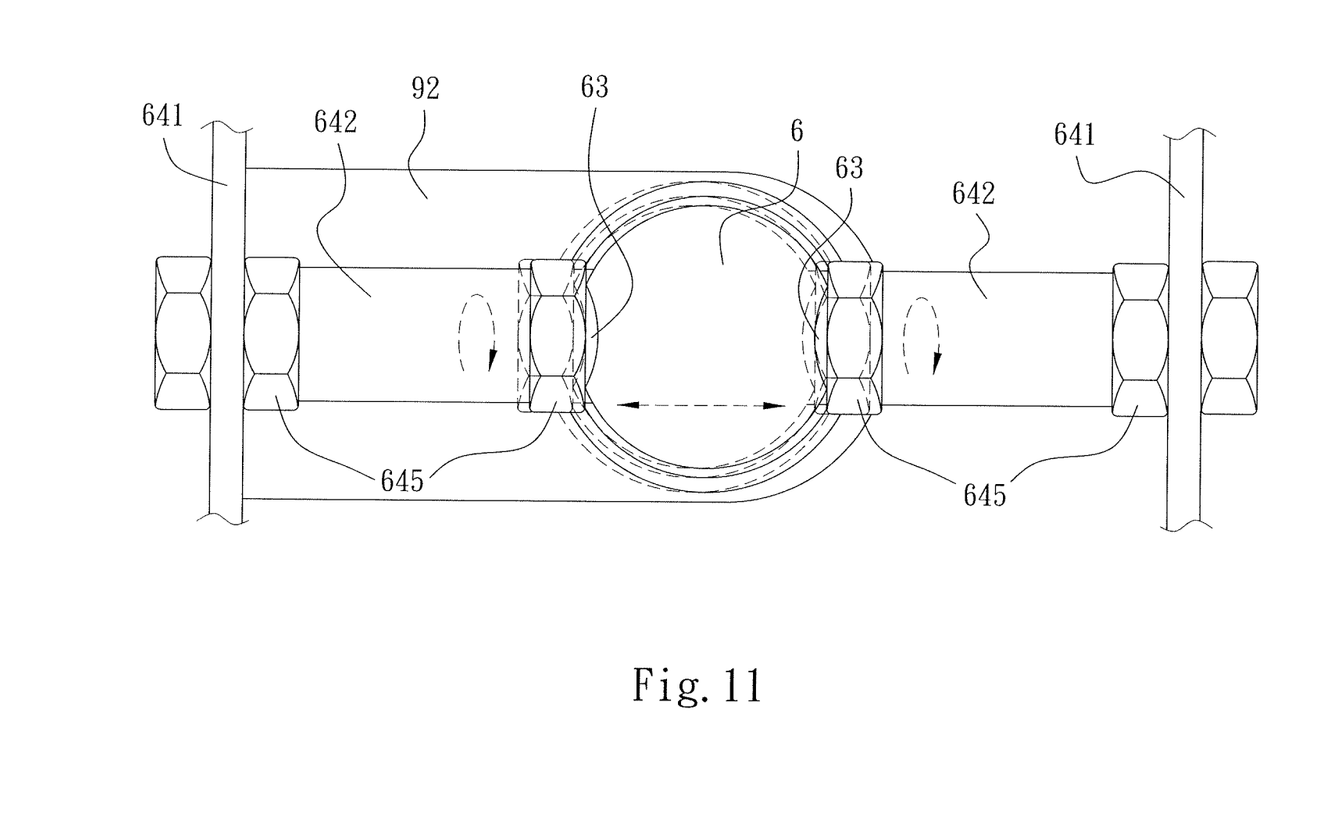
FIG. 11 is a schematic diagram of adjusting the tightness of conveyor strips of the present invention.

As shown in FIG. 4 and FIG. 5A, the conveyor belt 4 of the present invention further includes a pair of adjustment devices 64. The pair of adjustment devices 64 are provided correspondingly towards edges of the slot holes 92 of the tracks 9, respectively, and are pivotally connected to the two ends of the second transmission axle 6 to adjust the tightness of each of the conveyor strips 8, respectively. More specifically, one of adjustment device 64 includes two fixing pieces 641 fixed correspondingly towards the edge of each of the slot holes 92 of each of the tracks 9, and an adjusting rod 642 screwed and connected to the two fixing pieces 641 and for adjusting the tightness between the two ends of the second transmission axle 6 and each of the chains 7. The two fixing pieces 641 are right-angled structures. A plurality of second holes 640 are correspondingly provided at one end of each of the two fixing pieces 641 towards each of the positioning holes 921 of each of the tracks 9. One fixing piece 643 is inserted into one washer 644, and is fixed between each of the corresponding second holes 640 and each of the corresponding positioning holes 921. The adjusting rod 642 is inserted into the through hole 63 of the second transmission axle 6, and one other end of each of the two fixing pieces 641 is fastened by a screw nut 645 to adjust the tightness among the conveyor strips 8 (referring to FIG. 11), hence promoting smooth pivotal transmission of each of the conveyor strips 8 and each of the chains 7.

Referring to FIG. 9 and FIG. 10, to assemble the conveyor belt 4, each of the chains 7 is accommodated around the first gear 52 of the first transmission axle 5 and the second gear 62 of the second transmission axle 6 to become engaged and to form transmission. Each of the conveyor strips 8 is pivotally linked with each of the chains 7 at the two sides of the conveyor belt 4, and is located within an inner side of each of the chains 7. Each of the tracks 9 is arranged towards an outer side of each of the chains 7. The pair of adjustment devices 64 are pivotally connected to the second transmission axle 6 going out of each of the slot holes 92 of each of the tracks 9. Meanwhile, using the pair of adjustment devices 64, the tightness between the two ends of the second transmission axle 6 and each of the chains 7 is adjusted, so as to promote smooth pivotal transmission of each of the conveyor strips 8 and each of the chains 7, hence completing the assembly of the conveyor belt 4.

Again referring to FIG. 9 and FIG. 10, in the present invention, the conveyor belt 4 is pivotally connected to each of the conveyor strips 8, such that each of the conveyor strips 8 adaptively forms each of the conveyor belt surfaces 81 for conveying fried products and each of the conveyor lower surfaces 812 away from each of the conveyor belt surfaces 81. When the conveyor belt 4 of the present invention is driven by a power unit as a power motor to start operating, each of the conveyor strips 8 pivotally connected to each of the chains 7 coordinates with the chains 7 to maintain horizontal progressing. Further, when each of the conveyor strips 8 passes an arched position of the first transmission axle 5 and the second transmission axle 6, as the width W of each of the conveyor belt surface 81 is greater than the width W1 of each of the conveyor lower surfaces 812 of each of the conveyor strips 8, the gap 814 is formed among the conveyor lower surfaces 812 such that the conveyor lower surfaces 812 do not come into contact with one another. Further, arrangement gaps among the conveyor belt surfaces 81 are kept small to obtain an even and flat conveying plane to allow the conveyor belt surfaces 81 of each of the conveyor strip 8 to continually convey fried products. Further, the conveyor strips 8 are made of a high temperature resistant and anti-sticking material, Teflon™, and prevents fried products from sticking on the conveyor belt surfaces 81 and the conveyor lower surfaces 812, thereby increasing the mobility of fried products during the conveying process and enhancing the stability of conveying fried products.

What is claimed is:

1. An anti-sticking conveyor belt of a frying machine, applied as a conveyor belt for conveying fried products, the conveyor belt comprising:
   a first transmission axle and a second transmission axle, the first transmission axle and the second transmission axle oppositely disposed, the first transmission axle having one end thereof engaged with an external power unit, wherein each of the two opposite outer ends of the first transmission axle is pivotally connected to a first bearing and a first gear for the first transmission axle to rotate, and each of the two opposite outer ends of the second transmission axle is pivotally connected to a second bearing and a second gear for the second transmission axle to rotate;

two chains, each of the chains comprising a plurality of connecting portions, each of the chains accommodated around the first transmission axle and the second transmission axle to form engagement, power provided by the power unit driving each of the chains to progress along a turning track and driving the second transmission axle to rotate, wherein each of the connecting portions comprises an inner connecting section and an outer connecting section pivotally connected towards one end of the inner connecting section, each of the inner connecting sections comprises two wheel shafts each including a first axle opening, and an engagement space between the two wheel shafts and engaged with the first gear and the second gear to form transmission, each of the outer connecting sections comprises two second axle openings, and each of the two second axle openings is for pivotally connecting and linking with one of the wheel shafts of each of the inner connecting sections;

a plurality of connecting rods, the two ends of each of the connecting rods pivotally connected and linked with each of the chains; and a plurality of conveyor strips, made of a high temperature resistance and anti-sticking material, each of the conveyor strips comprising a conveyor belt surface for conveying the fried products, a conveyor lower surface away from each of the conveyor belt surfaces, and a channel provided outwards at each of two sides between each of the conveyor belt surfaces and each of the conveyor lower surfaces;

wherein, each of the channels is inserted by one of the connecting rods, the two ends of each of the connecting rods are pivotally connected and linked with each of the chains to drive each of the conveyor strips to rotate, and each of the conveyor belt surfaces is larger than each of the conveyor lower surfaces, with cooperation of each of the chains, the conveyor strips are maintained to progress levelly, the conveyor lower surfaces do not come into contact with one another when each of the chains reaches an arched position of the first transmission axle and the second transmission axle, and arrangement gaps among the conveyor belt surfaces are kept small to obtain an even and flat conveying plane.

2. The anti-sticking conveyor belt of a frying machine of claim 1, wherein an axle shaft is extended from each of the two ends of each of the connecting rods, the outer diameter of the two axle shafts is smaller than the outer diameter of the connecting rods, the two axle shafts are respectively penetrated and pivotally connected towards the two second axle openings of each of the outer connecting sections or respectively penetrated and pivotally connected towards the two first axle openings of each of the inner connecting sections, a fastening holes is provided at each of the two ends of each of the connecting rods, and each of the fastening holes of each of the axle shafts is inserted by and fastened with a fastening member.

3. The anti-sticking conveyor belt of a frying machine of claim 1, wherein the anti-sticking material is Teflon™.

4. An anti-sticking conveyor belt of a frying machine, applied as a conveyor belt for conveying fried products, the conveyor belt of claim 1, further comprising:

a first transmission axle and a second transmission axle, the first transmission axle and the second transmission axle oppositely disposed, the first transmission axle having one end thereof engaged with an external power unit;

two chains, each of the chains comprising a plurality of connecting portions, each of the chains accommodated around the first transmission axle and the second transmission axle to form engagement, power provided by the power unit driving each of the chains to progress along a turning track and driving the second transmission axle to rotate;

a plurality of connecting rods, the two ends of each of the connecting rods pivotally connected and linked with each of the chains;

a plurality of conveyor strips, made of a high temperature resistance and anti-sticking material, each of the conveyor strips comprising a conveyor belt surface for conveying the fried products, a conveyor lower surface away from each of the conveyor belt surfaces, and a channel provided outwards at each of two sides between each of the conveyor belt surfaces and each of the conveyor lower surfaces; and two tracks disposed towards an outer side of each of the chains, each of an upper section and a lower section at an inner side of each of the tracks provided with a guiding bracket for supporting and holding each of the chains to guide each of the chains to be steady on the turning track;

wherein each of the channels is inserted by one of the connecting rods, the two ends of each of the connecting rods are pivotally connected and linked with each of the chains to drive each of the conveyor strips to rotate, and each of the conveyor belt surfaces is larger than each of the conveyor lower surfaces, with cooperation of each of the chains, the conveyor strips are maintained to progress levelly, the conveyor lower surfaces do not come into contact with one another when each of the chains reaches an arched position of the first transmission axle and the second transmission axle, and arrangement gaps among the conveyor belt surfaces are kept small to obtain an even and flat conveying plane;

wherein, each of the tracks comprises a first hole for penetrating the two ends of the first transmission axle, and a slot hole away from one end of the first hole and for penetrating the two ends of the second transmission axle, and a plurality of positioning holes are provided at edge positions of each of the slot holes of each of the tracks.

5. The anti-sticking conveyor belt of a frying machine of claim 4, further comprising:

a pair of adjustment devices, respectively provided correspondingly at the edge of each of the tracks, respectively pivotally connected to the two ends of the second transmission axle to adjust tightness of each of the conveyor strips.

6. The anti-sticking conveyor belt of a frying machine of claim 5, wherein each of the adjustment devices comprises two fixing pieces fixed correspondingly towards the edge of each of the tracks, and an adjusting rod screwed and connected to the two fixing pieces and for adjusting tightness between the two ends of the second transmission axle and each of the chains.

7. The anti-sticking conveyor belt of a frying machine of claim 6, wherein the two fixing pieces are right-angled structures, a plurality of second holes are correspondingly provided at one end of each of the two fixing pieces towards each of the positioning holes of each of the tracks, and one fixing piece is inserted into one washer and fixed between each of the second holes and each of the positioning holes.

8. The anti-sticking conveyor belt of a frying machine of claim 4, wherein each of the tracks further comprises at least one inspection opening for inspecting each of the conveyor strips of the conveyor belt.

\* \* \* \* \*